Aug. 13, 1963        F. P. KING         3,100,541
                      PIT PLOW
Filed May 12, 1961                    4 Sheets-Sheet 1

Ferdinand P. King
        INVENTOR.

Aug. 13, 1963
F. P. KING
3,100,541
PIT PLOW
Filed May 12, 1961
4 Sheets-Sheet 2
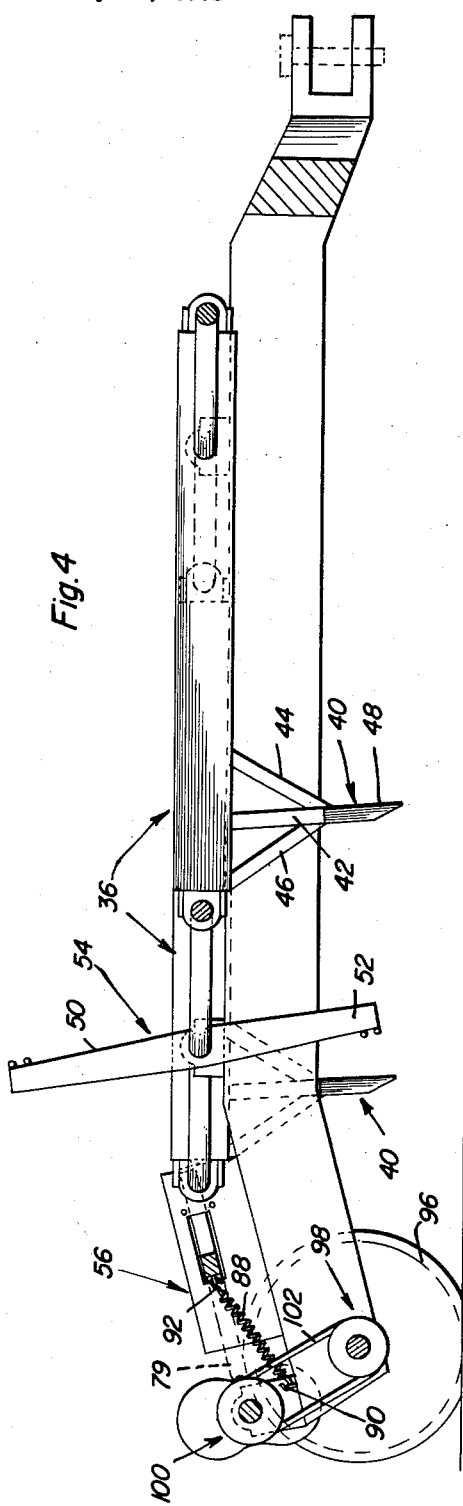
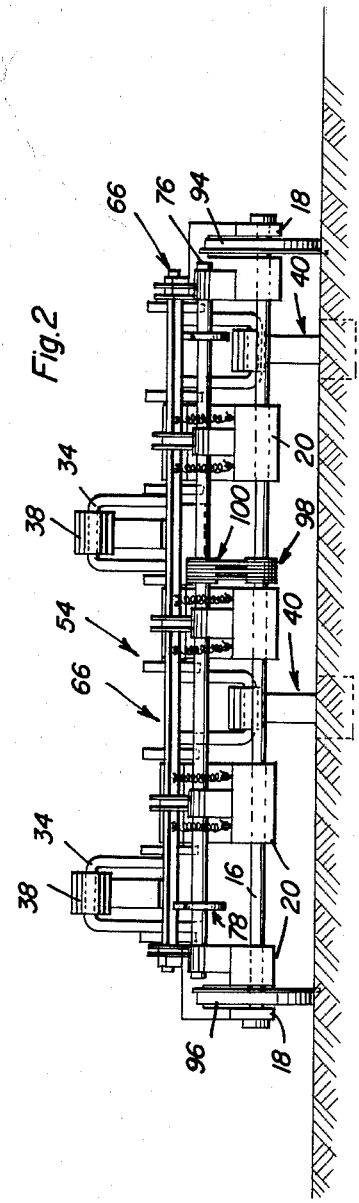
Ferdinand P. King
INVENTOR.
BY *Clarence A. O'Brien
and Harvey B. Jacobson*
Attorneys

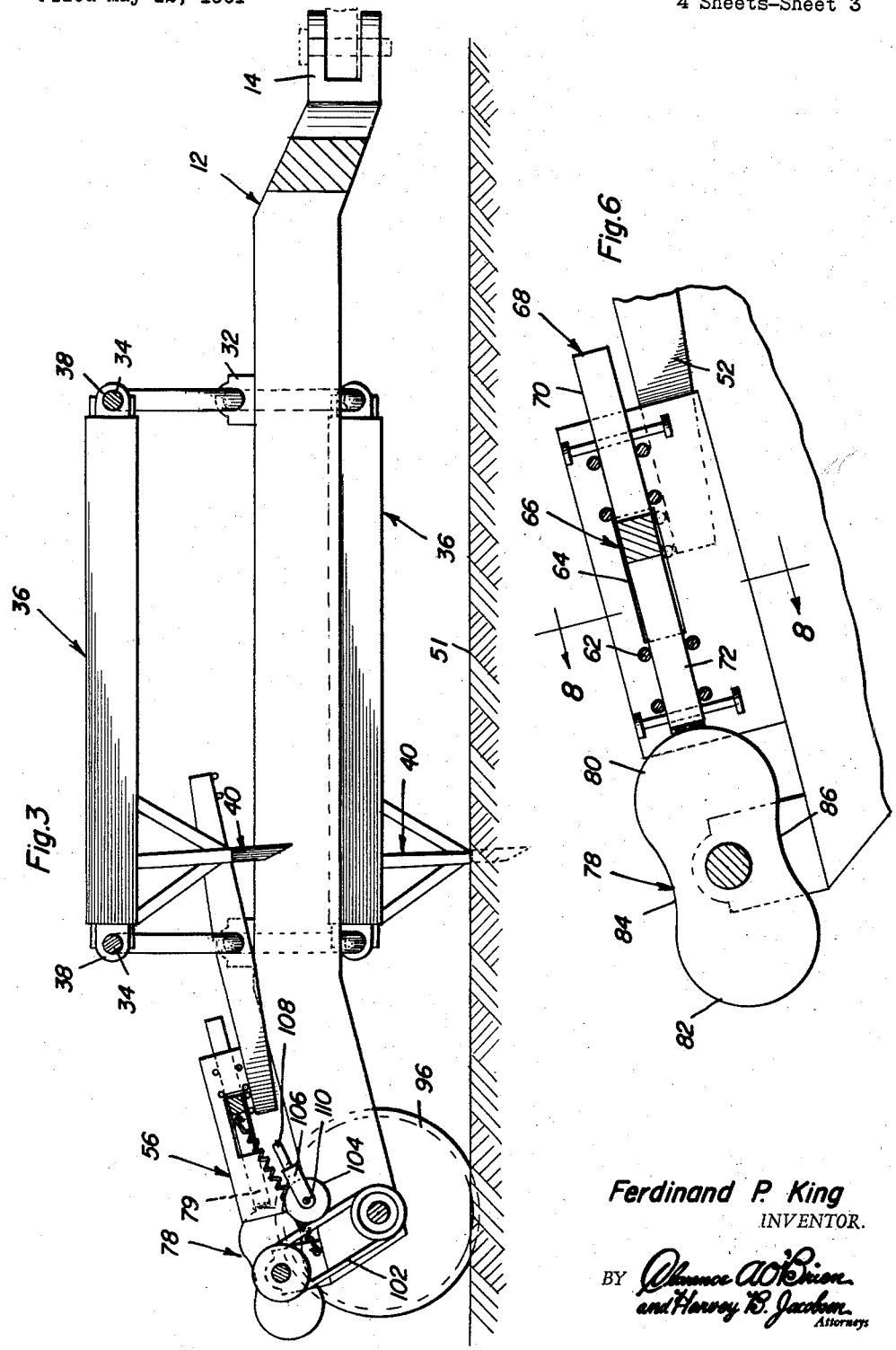

Aug. 13, 1963 F. P. KING 3,100,541
PIT PLOW
Filed May 12, 1961 4 Sheets-Sheet 4
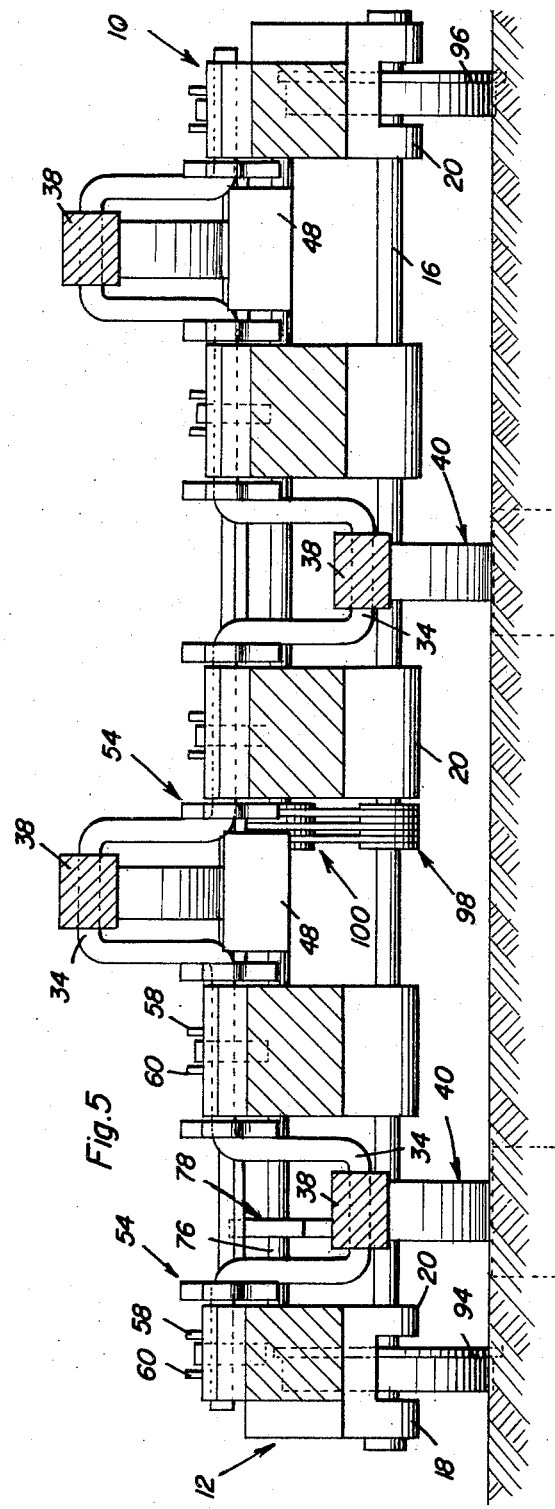
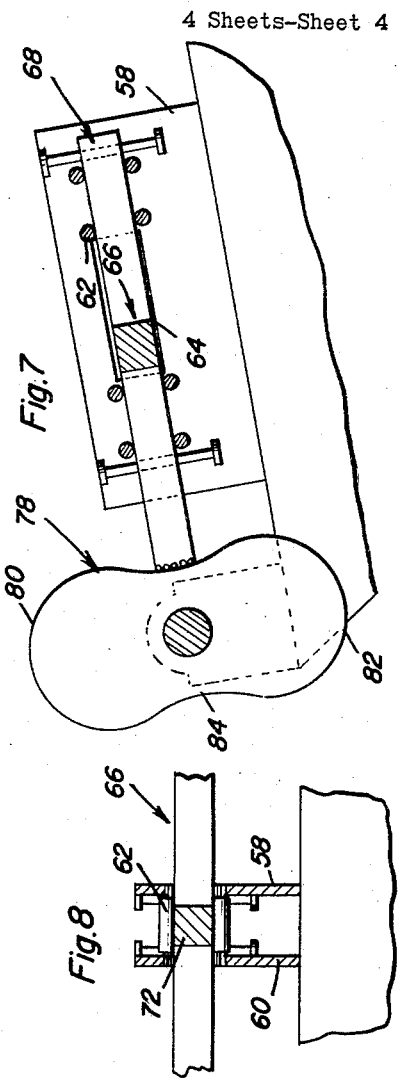
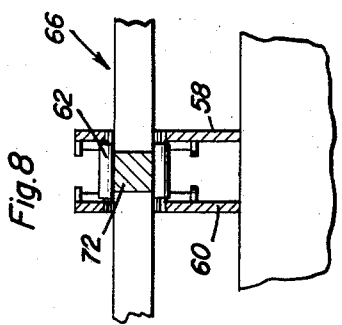
Ferdinand P. King
INVENTOR.

United States Patent Office 3,100,541
Patented Aug. 13, 1963

3,100,541
PIT PLOW
Ferdinand P. King, Rte. C, Box 180, Lamesa, Tex.
Filed May 12, 1961, Ser. No. 109,538
6 Claims. (Cl. 172—86)

This invention relates to a novel and useful pit plow and more specifically to a pit plow adapted to carry out pitting operations on barrens ranges in rainfall areas having less than twenty inches of rainfall annually. Although the greatest benefits are realized from pitting operations performed in barren range lands having less than twenty inches of rain annually, it is to be understood that the pit plow of the instant invention will also afford considerable advantages in other than barren areas and areas having more than twenty inches of rainfall annually.

Pit plows have in the past utilized relatively narrow chisel pointed digging elements and these relatively narrow elements have not be proven to be successful inasmuch as each pit formed by a narrow chisel pointed digging element has a tendency to seal over in a relatively short period of time. Accordingly, the pit plow of the instant invention is provided with relatively wide digging elements in the order of from 8" to 16" wide.

By performing pitting operations on sloping or flat land inadequate rainfall may more readily be retained for promoting vegetation and decreasing erosion. As hereinbefore set forth the pits should be in the neighborhood of from 8" to 16" wide and in the general neighborhood of 6" deep. By penetrating at least 6" into the soil the baked upper layer of the soil is removed to expose the more porous underlayers of the soil. This more porous soil structure more readily absorbs water and inasmuch as each pit formed exposes an area of soil many times greater than the plan area of the pit, more surface of the soil is exposed for absorbing rainfall or watershed. Consequently, by the provision of a greater area of soil to absorb water and the exposing of more porous underlayers of soil, considerably more rainfall and watershed is retained for promoting vegetation and decreasing wind and water erosion. Although it has been specifically set forth that each pit should be in the neighborhood of 6" deep, in the absence of a hardpan layer of soil the pits may be formed with greater depth.

In order that water erosion will not result from the forming of pits in farmland the pits should be arranged in a staggered pattern and the pit plow of the instant invention may be constructed to provide the desired pattern of pits which would meet the approval of governing soil conservation authorities. It is to be understood that the pit plow of the instant invention may be readily manufactured to provide the desired pattern of pits without deviating from the general construction of the pit plow.

The main object of this invention is to provide a pit plow capable of forming relatively wide pits in farmland having appreciable length and depth. It is to be understood that the length and depth may be altered or varied in accordance with the condition of the soil being pitted.

A further object of this invention is to provide a pit plow in accordance with the immediately preceding object which will be capable of forming a plurality of pits in substantially all types of range and farmland.

Still another object of this invention is to provide a pit plow which may be readily trailed behind a draft vehicle and will be substantially automatic in operation.

A still further object of this invention is to provide a pit plow constructed in a manner whereby the length of the pits being formed may be varied at the will of an operator controlling the draft vehicle.

A final object to be specifically enumerated herein is to provide a pit plow which will conform to conventional forms of manufacture, be of simple construction and automatic in operation so as to provide a device that will be economically feasible, long lasting and relatively easy to operate.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 2 is a rear end elevational view of the pit plow;

FIGURE 3 is a longitudinal vertical sectional view of the pit plow taken substantially upon the plane indicated by the section line 3—3 of FIGURE 1 and on somewhat of an enlarged scale;

FIGURE 4 is a longitudinal vertical sectional view similar to that of FIGURE 3 but showing component parts of the plow in different positions than that shown in FIGURE 3;

FIGURE 5 is a transverse vertical sectional view taken substantially upon the plane indicated by the section line 5—5 of FIGURE 1 and on somewhat of an enlarged scale;

FIGURE 6 is a fragmentary enlarged side elevational view of the lock means of the pit plow by which pairs of the digging elements may be alternately maintained in stationary lowered ground-engaging positions;

FIGURE 7 is a fragmentary side elevational view similar to that of FIGURE 6 but showing component parts of the lock means in different positions relative to each other; and FIGURE 8 is a fragmentary transverse vertical sectional view taken substantially upon the plane indicated by the section line 8—8 of FIGURE 6.

Figure 1:
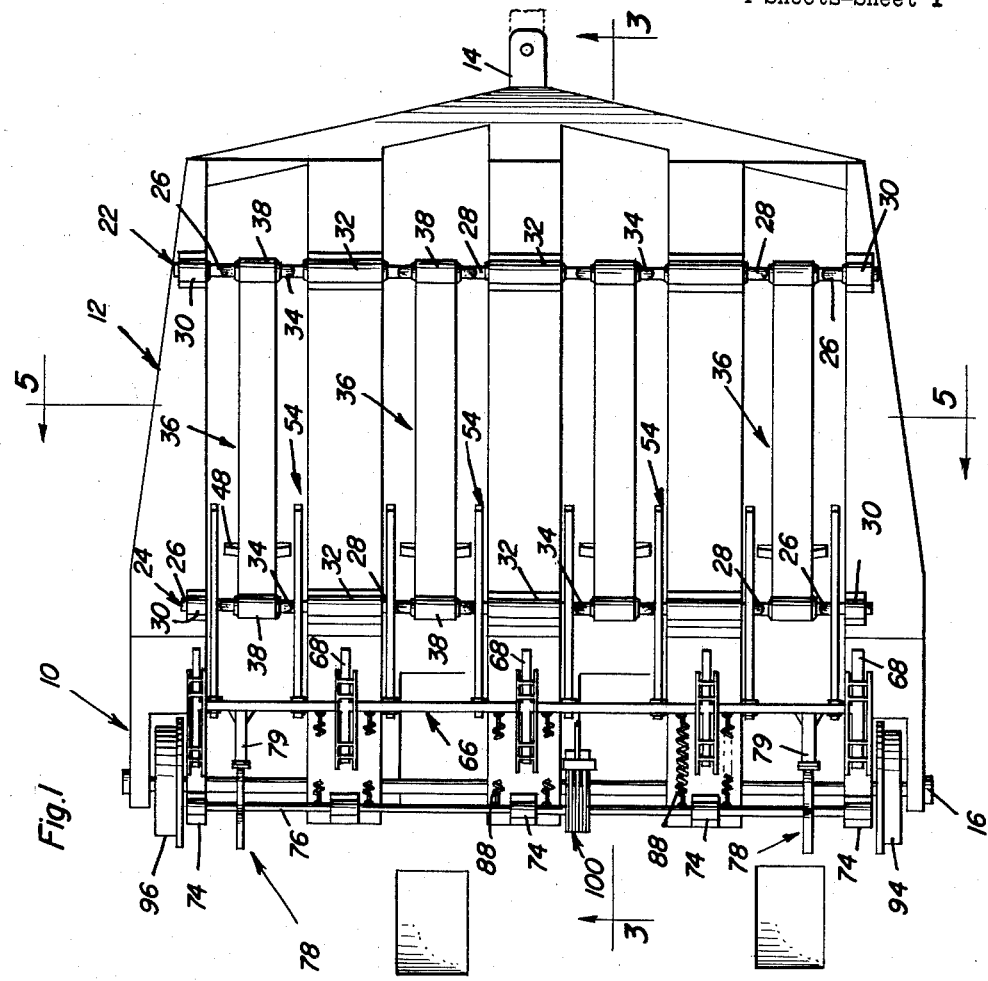
FIGURE 1 is a top plan view of the pit plow showing the manner in which a staggered pattern of pits may be formed by trailing the pit plow behind a draft vehicle over range land.

Referring now more specifically to the drawings the numeral 10 generally designates the pit plow of the instant invention. The pit plow 10 includes a main frame generally referred to by the reference numeral 12 which is generally horizontally disposed and is provided with a hitch means 14 on its forward end adapted for engagement with a complementary hitch element on a draft vehicle. An axle 16 is carried by the rear end of the frame 12 and is journaled for rotation about an axis extending transversely of the frame 12 by means of a pair of opposite end journals 18 and a plurality of intermediate journals 20.

A pair of substantially identical crankshaft members generally referred to by the reference numerals 22 and 24 are carried by the frame 12 and are journaled for rotation about longitudinal spaced axes extending transversely of the frame 12. Each crankshaft 22 and 24 includes opposite end and intermediate journal portions 26 and 28 respectively and the journal portions 26 are rotatably received in journals 30 and the journal portions 28 are rotatably received in intermediate journals 32. The journals supporting each crankshaft 22 and 24 are axially aligned and each crankshaft 22 and 24 includes a plurality of eccentric throws 34. Each crankshaft 22 and 24 includes four throws 34 although it is to be noted that the number of throws on each crankshaft may be varied as desired in order to afford the desired pattern of pits. A walking-beam generally referred to by the reference numeral 36 has its opposite end portions disposed between corresponding throws 34 of the crankshafts 22 and 24 and each walking-beam 36 includes a pair of opposite end journals 38 which rotatably receive the corresponding throw 34.

It will be noted that the walking-beams 36 are substantially horizontally disposed and that each includes a depending digging member or blade generally referred to by the reference numeral 40. Each blade 40 includes a depending shank portion 42 including fore-and-aft inclined bracing members 44 and 46. Each of the shanks 42 has a laterally enlarged head portion 48 on its terminal lower end portion for engagement with the ground 51, see FIGURES 2, 3 and 5.

The crankshaft 24 is provided with two pair of diametrically opposite and radially extending abutment arms 50 and 52. Each pair of abutment arms 50 and 52 comprises a single abutment arm member generally referred to by the reference numeral 54 which extends diametrically of each journal portion 26 and 28 of the crankshaft 24.

The frame 12 includes a plurality of longitudinally extending slide guide assemblies generally referred to by the reference numeral 56. As can best be seen from FIGURES 7 and 8 of the drawings each of the slide guide assemblies 56 includes a pair of parallel plates 58 and 60 which extend upwardly from the frame 12.

Each pair of plates 58 and 60 have a plurality of vertically spaced pairs of rollers 62 extending therebetween and journaled for rotation about horizontal axes. Additionally, each of the plates 58 and 60 includes a longitudinal slot 64.

An elongated transversely extending abutment shaft generally referred to by the reference numeral 66 is slidably received in the aligned slots 64 of each pair of plates 58 and 60. The abutment shaft 66 includes a plurality of slide guide arms generally referred to by the reference numeral 68 and each slide guide arm includes opposite end portions 70 and 72 projecting from opposite sides of the abutment shaft 66. Each of the slide guide arms 68 is slidingly disposed between one pair of opposing plates 58 and 60 and between the rollers 62 of each pair of rollers. In this manner, the transversely extending abutment shaft is mounted for rectilinear sliding movement relative to the frame 12.

The main frame includes a plurality of journals 74, see FIGURE 1 which rotatably receive a transversely extending camshaft 76. The camshaft 76 has a plurality of cam lobes generally referred to by the reference numeral 78 fixedly secured thereto and for rotation with the camshaft 76. Two cam follower arms 79 on opposite ends of the abutment shaft 66 are in longitudinal alignment with the corresponding cam lobes 78 and each lobe 78 includes diametrically opposite toe portions 80 and 82 and diametrically opposite heel portions 84 and 86. The rear end portions of the cam follower arms 79 carried by the opposite ends of the abutment shaft 66 are disposed in sliding contacting relation with the cam lobes 78 and the abutment shaft 66 is yieldably urged to a rearmost position by means of expansion springs 88 secured between the rear end of the frame 12 as at 90 and the abutment shaft 76 as at 92.

The axle 16 has a pair of ground-engaging wheels 94 and 96 fixedly secured for rotation therewith and the axle 16 also includes a pulley assembly generally referred to by the reference numeral 98. The camshaft 76 also has a pulley assembly 100 fixedly secured thereto and a plurality of endless belts 102 are entrained about the pulley assemblies 98 and 100 and are normally disposed in untensioned condition. However, the frame 12 has a belt tensioning roller 104 rotatably mounted between a bifurcated end portion 106 of an actuator rod 108 by means of pivot pin 110 and the actuator rod may be suitably mounted for rectilinear movement by the frame 12 in any convenient manner and provided with suitable controls operable from the draft vehicle by which the plow 10 is being pulled. In this manner, the operator of the draft vehicle may control the tensioning of the endless flexible belts 102.

In operation, and assuming that the endless belts 102 are tensioned, upon forward movement of the plow 10 the ground-engaging wheels 94 will effect rotation of the camshaft 76. The cam lobes 78 are identically positioned on the shaft 76 and as the cam lobes 78 rotate to a position having their toe portions 80 in engagement with the rear ends of the cam follower arms 79 opposite ends of the abutment shaft 66, the abutment shaft 66 will be urged forwardly to the position illustrated in FIGURE 6 of the drawings. In this forwardmost position defined by the forwardmost extremities of the slots 64 the abutment shaft 66 is disposed in the path of the movement of the outer ends of the abutment arms 50 and 52. As the abutment arm 52 engages the undersurface of the abutment shaft 66 the walking-beams will be maintained in a stationary position with half of the digging blades 40 disposed in lower ground-engaging positions and the other half of the blades 40 disposed in raised retracted positions. As soon as the cam lobes 78 rotate a sufficient amount from the position illustrated in FIGURE 6 of the drawing to the position illustrated in FIGURES 4 and 7 of the drawings, the springs 88 will urge the abutment shaft 66 to its rearmost position defined by the rearmost extremities of the slots 64 whereupon the abutment shaft 66 will be moved out of the path of movement of the free end portions of the abutment arms 50 and 52. Further forward movement of the plow 10, by the engagement of half of the digging elements 40 with the ground 51, will effect rotation of the crankshafts 22 and 24. This will raise the blades 40 previously engaged with the ground 51 and lower the other blades 40 into engagement with the ground 51. As the cam lobes 78 rotate to a position with the toe portions 82 in engagement with the rear ends of the cam follower arms 79, the abutment shaft 66 will again be urged forwardly to engage the abutment arms 50 whereby the walking-beams 36 will again be maintained stationary but with the blades 40 last engaged with the ground 51 disposed in the lowermost ground-engaging positions.

If it is desired to merely pierce the ground 51 with the blades 40 as might be the case in extremely hard terrain, the tensioning roller may be moved forwardly in order to release the tension of the endless belts 102 whereby the momentum of the walking-beams 36 will continue rotation of the crankshafts 22 and 24 and the engagement of all of the blades 40 with the ground 51 without intermittently maintaining the blades 40 in stationary position relative to the frame 12. Still further, if the tensioning roller 104 is moved forwardly and out of engagement with the endless flexible belts 102 while the crankshafts 22 and 24 are being held stationary by means of either the abutment arms 50 or the abutment arms 52, rotation of the ground-engaging wheels 94 will be ineffective to rotate the cam lobes 78 whereby the blades 40 disposed in engagement with the ground 51 will be maintained stationary relative to the frame 12 and in engagement with the ground 51 until such time as the endless flexible belts 102 are again tensioned by means of the tensioning roller 104. In this manner, the pits 114 may be formed of any desirtd length. Accordingly, the pit plow 10 may be utilized to form a predetermined pattern of pits 114 of a predetermined length, a predetermined pattern of holes or short pits of a shape in plan area substantially equal to the horizontal cross sectional area of the blades 40 and a pattern of pits of any desired length. Thus, it will be seen that the plow 10 is designed to perform a plurality of pitting operations.

In addition to operating in the above set forth manner, the plow 10 may be provided with a plurality of blades 40 on each walking-beam 36 and various gear ratios may be utilized by changing the effective diameters of the pulley assemblies 88 and 100 to vary the pattern of pits formed by the plow 10.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A pit plow comprising a longitudinally extending frame, ground-engaging wheels, means on said frame journaling said wheels for rotation about axes extending transversely of said frame, at least one pair of transversely spaced digging means, mounting means carried by said frame mounting said digging means for movement between raised retracted positions and lowered ground-engaging positions relative to said frame, said mounting means including means connecting one of said digging means to the other for inverse movement relative thereto, and lock means movably mounted on said frame for movement between extended and retracted positions in response to rotation of said ground engaging wheels and into and out of positions respectively engageable with portions of said mounting means for automatically alternately retaining said digging means stationary in the lowered ground-engaging positions, manually releasable means connecting said journaling means and said lock means for varying the timed sequence of retention of said digging means in lowered ground-engaging positions independently of rotation of said wheels.

2. The combination of claim 1 wherein said wheels are carried by the rear end of said frame, the forward end of said frame including hitch means adapted for securement to a draft vehicle.

3. The combination of claim 1 including a pair of abutment arms carried by at least one of said crankshafts and extending generally radially outwardly therefrom, cam means rotatably journaled from said frame for movement about an axis extending transversely of said frame, said lock means comprising cam follower means movably mounted on said frame for movement toward and away from the axes of rotation of said cam means and including one portion disposed in engagement with said cam means, said cam follower means also including an abutment portion movable into and out of alignment with the path of movement of the outer ends of said arms in response to rotation of said cam means for intermittent engagement with said abutment arms thereby intermittently locking said one crankshaft against rotation relative to said frame.

4. The combination of claim 3 wherein said cam means includes a camshaft journaled in said frame for movement about an axis extending transversely of the latter, at least one cam lobe carried by said camshaft for rotation therewith, said one portion including at least one longitudinally extending cam follower arm aligned with said cam means.

5. The combination of claim 4 wherein said cam follower comprises an elongated transversely extending abutment shaft slidably mounted on said frame for rectilinear movement longitudinally of said frame into and out of the path of movement of said abutment arms and substantially in alignment with the axis of rotation of said one crankshaft, said one cam follower arm including a laterally projecting arm on said abutment shaft longitudinally aligned with said cam lobe, said one portion comprising the terminal free end portion of said abutment arm.

6. The combination of claim 5 wherein said journaling means includes an axle journaled from said frame for rotation about an axis extending transversely of said frame, said wheels secured to said axle for rotation therewith, aligned pulley means carried by said axle and camshaft, at least one endless flexible belt entrained over said pulley means and normally disposed in an untensioned condition, said manually releasable means comprising a belt tensioning member movably mounted on said frame for selectively increasing and decreasing the tension of said belt.

References Cited in the file of this patent

UNITED STATES PATENTS

| | | |
|---|---|---|
| 1,210,092 | McKay | Dec. 26, 1916 |
| 2,645,987 | Brooks | July 21, 1953 |
| 2,767,633 | Franz | Oct. 23, 1956 |

FOREIGN PATENTS

| | | |
|---|---|---|
| 38,754 | Austria | Sept. 10, 1909 |